(12) United States Patent
Sultenfuss et al.

(10) Patent No.: US 9,590,793 B2
(45) Date of Patent: *Mar. 7, 2017

(54) APPARATUS AND METHOD FOR SIGNAL AGGREGATION IN AN INFORMATION HANDLING SYSTEM

(71) Applicant: DELL PRODUCTS, LP, Round Rock, TX (US)

(72) Inventors: Andrew T. Sultenfuss, Leander, TX (US); Liam B. Quinn, Austin, TX (US); Sean P. O'Neal, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,315

(22) Filed: Jun. 21, 2016

(65) Prior Publication Data

US 2016/0301512 A1    Oct. 13, 2016

Related U.S. Application Data

(63) Continuation of application No. 14/301,817, filed on Jun. 11, 2014, now Pat. No. 9,391,761.

(51) Int. Cl.
*H04J 3/04* (2006.01)
*H04L 5/00* (2006.01)

(52) U.S. Cl.
CPC .......... *H04L 5/0096* (2013.01); *H04L 5/0044* (2013.01)

(58) Field of Classification Search
CPC ...................................................... H04L 25/14
See application file for complete search history.

(56) References Cited

U.S. PATENT DOCUMENTS

| 6,781,968 B1* | 8/2004 | Colella | H04B 7/18504 342/354 |
|---|---|---|---|
| 7,084,742 B2 | 8/2006 | Haines | |
| 8,320,850 B1 | 11/2012 | Khlat | |
| 8,437,299 B2* | 5/2013 | Pan | H03M 3/47 370/329 |
| 2010/0302983 A1 | 12/2010 | McBeath et al. | |

* cited by examiner

*Primary Examiner* — Samina Choudhry
(74) *Attorney, Agent, or Firm* — Larson Newman, LLP (57) ABSTRACT

An information handling system includes a first subsystem having a first data module configured to provide a first signal, a second data module configured to provide a second signal, the first signal and the second signal are different types of signals, and a first aggregator unit coupled to the first data module and the second data module, and a second subsystem coupled to the first aggregator unit via a first aggregated signal line. The first aggregator unit receives the first signal from the first data module and the second signal from the second data module, aggregates, based upon a first aggregation algorithm, the first and second signals to create a first aggregated signal. The first aggregation algorithm aggregates the first signal and the second signal based on a specific type of each signal and provides the first aggregated signal to the second subsystem via the first aggregated signal line.

17 Claims, 4 Drawing Sheets

APPARATUS AND METHOD FOR SIGNAL AGGREGATION IN AN INFORMATION HANDLING SYSTEM

CROSS REFERENCE TO RELATED APPLICATION

This application is a continuation of U.S. patent application Ser. No. 14/301,817, entitled "Apparatus and Method for Signal Aggregation in an Information Handling System," filed on Jun. 11, 2014, the disclosure of which is hereby expressly incorporated by reference in its entirety.

FIELD OF THE DISCLOSURE

This disclosure generally relates to information handling systems, and more particularly relates to an apparatus and method for signal aggregation in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. An information handling system can include an embedded controller that provides an interface for the management of resources in the information handling system. An information handling system includes a wide variety of busses, control interfaces, and control signals. An information handling system can employ a point of load power distribution topology where the power is regulated adjacent to the various loads.

BRIEF DESCRIPTION OF THE DRAWINGS

It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
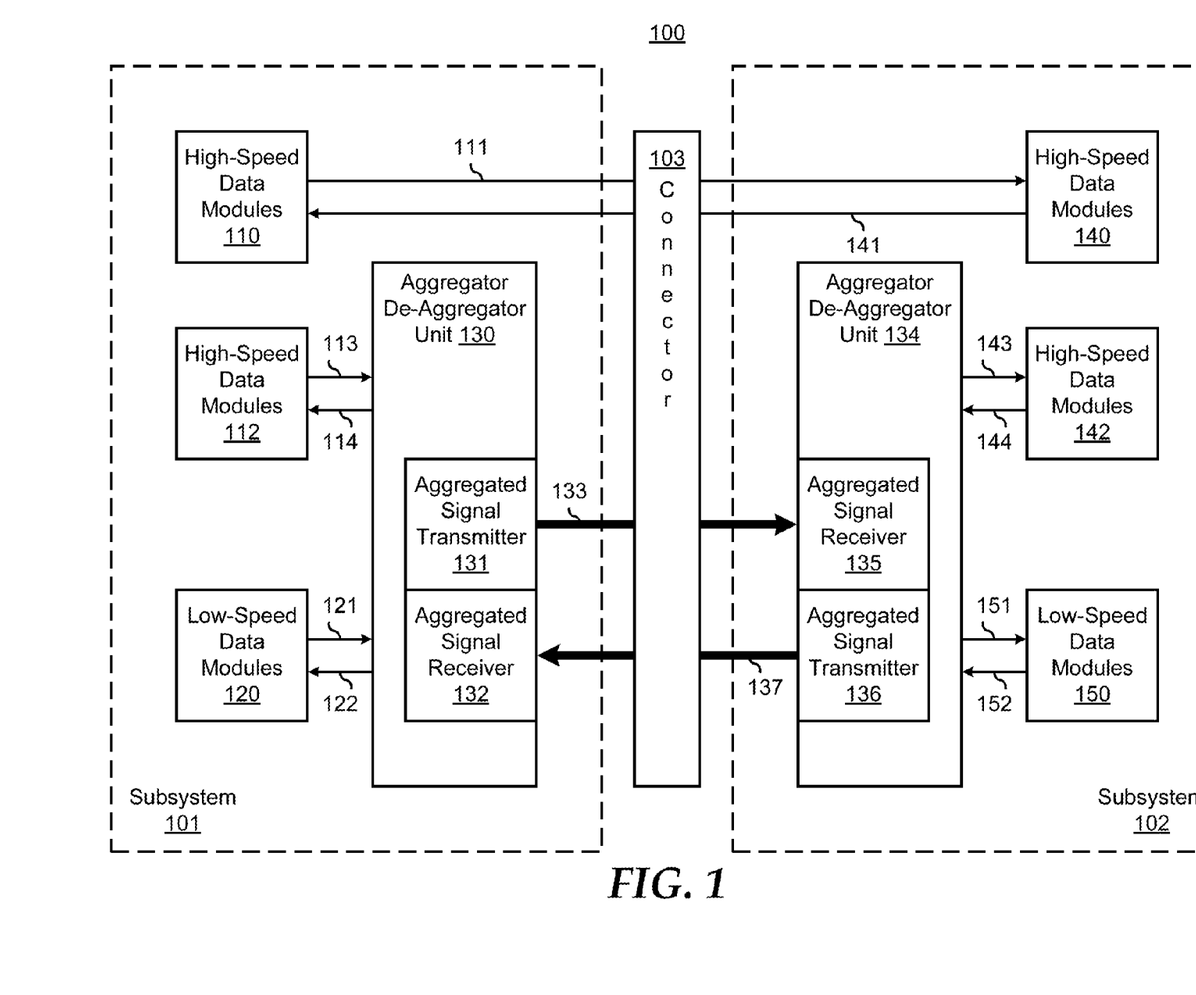
FIG. 1 is a block diagram illustrating an information handling system for signal aggregation according to an embodiment of the present disclosure.
Figure 2:
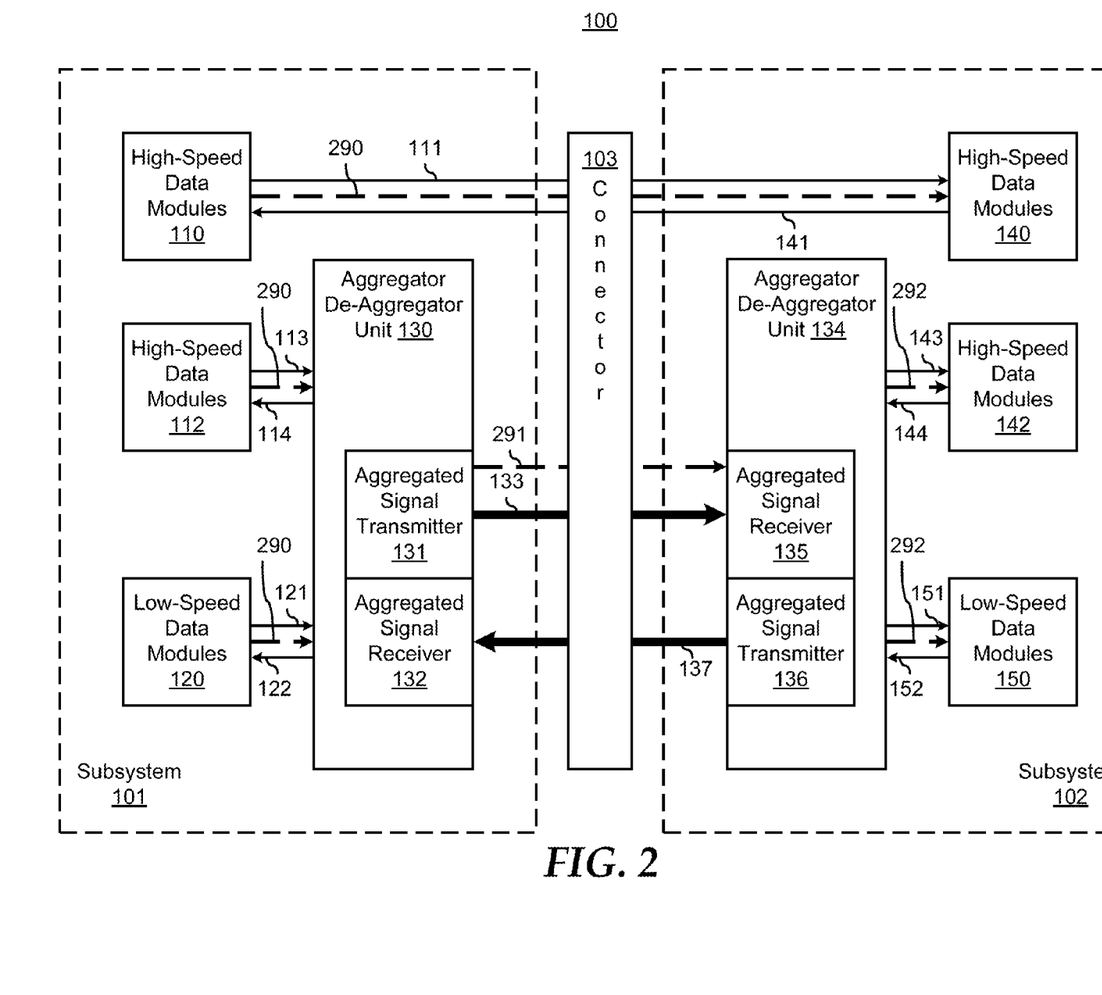
FIG. 2 is a block diagram showing an execution flow of a transmission of diverse signals from a first subsystem to a second subsystem.
Figure 3:
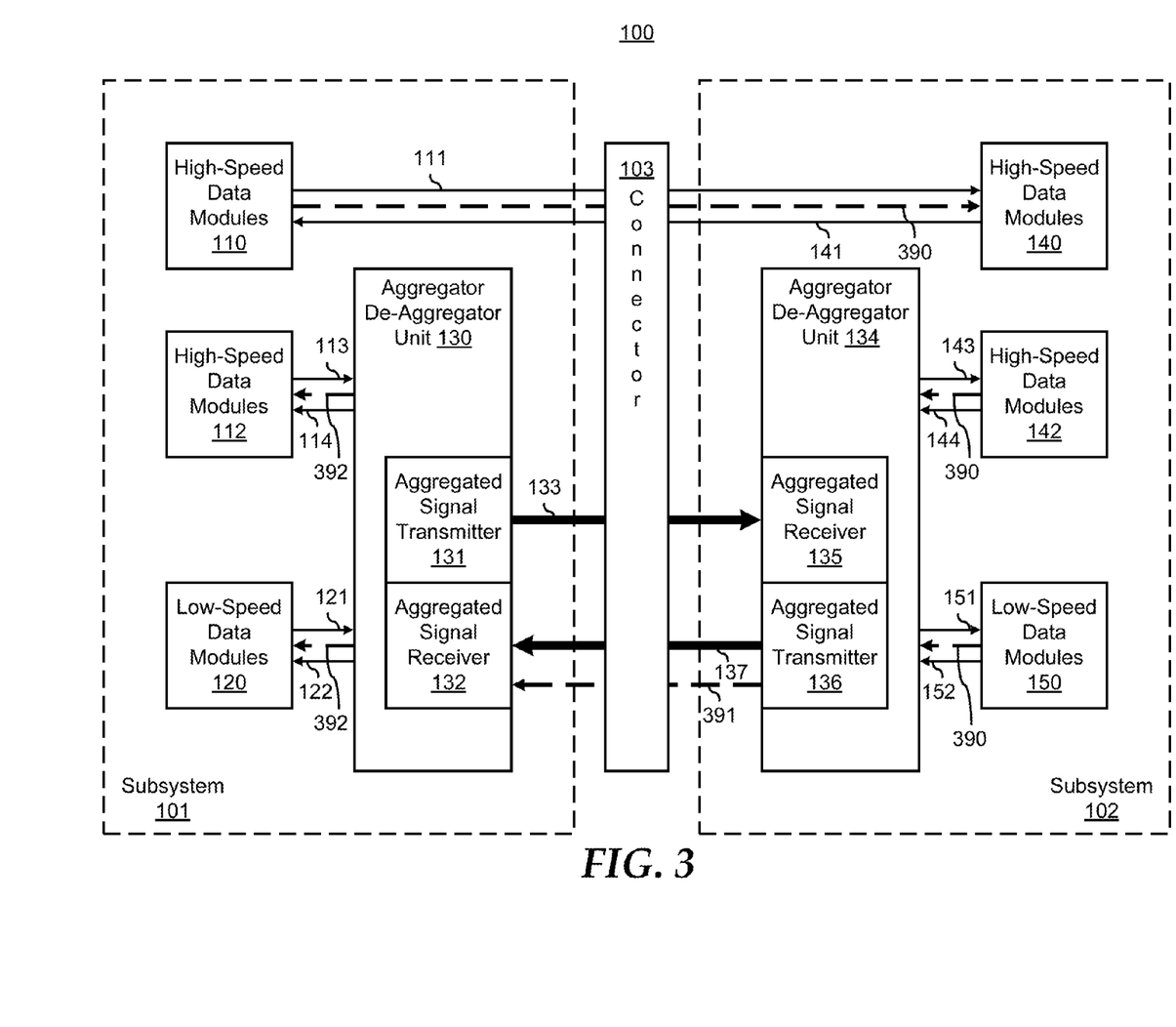
FIG. 3 is a block diagram showing an execution flow of a transmission of diverse signals from the second subsystem to the first subsystem.

FIGS. 1-3 illustrate an information handling system and methods for aggregating and de-aggregating a plurality of diverse signals to reduce and share cabling requirements in a scalable manner, according to an embodiment of the present disclosure.

FIG. 1 shows an information handling system 100 that includes a subsystem 101 connected to a subsystem 102 via a connector 103. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as a Central Processing Unit (CPU), a Programmable Logic Array (PLA), an embedded device such as a System-On-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various Input and Output (I/O) devices, such as a keyboard, a mouse, and a video display.

Examples of subsystems 101 and 102 includes a laptop computer base subsystem and an associated Liquid Crystal Display (LCD) lid-up structure subsystem, a mobile phone computing device base subsystem and an associated human interfaces structure subsystem, a tablet computer and an associated display structure subsystem, a database server subsystem and a web server subsystem, or the like. Subsystem 101 includes one or more high-speed data modules 110 for transmitting or receiving one or more high-speed signals via one or more high-speed signal lines 111 and 141, one or more high-speed data modules 112 for transmitting or receiving one or more high-speed signals via one or more high-speed signal lines 113 and 114, and one or more low-speed data modules 120 for transmitting or receiving one or more low-speed signals via one or more low-speed signal lines 121 and 122. High-speed signal lines 113 and 114, and low-speed signal lines 121 and 122, are connected to an aggregator/de-aggregator unit 130. Aggregator/de-aggregator unit 130 includes an aggregated signal transmitter 131 and an aggregated signal receiver 132. Aggregated signal transmitter 131 sends an aggregated signal, as described below, via an aggregated signal line 133 to subsystem 102. Aggregated signal receiver 132 receives an aggregated signal, as described below, via an aggregated signal line 137 from subsystem 102.

Subsystem 102 includes one or more high-speed data modules 140 for receiving and transmitting the one or more high-speed signals associated with high-speed data modules 110 via high-speed signal lines 111 and 141, one or more high-speed data modules 142 for receiving and transmitting the one or more high-speed signals associated with high-speed data modules 112 via one or more high-speed signal lines 143 and 144, and one or more low-speed data modules 150 for receiving and transmitting the one or more low-speed signals associated with low-speed data modules 120 via one or more low-speed signal lines 151 and 152. High-speed signal lines 143 and 144 and low-speed signal lines 151 and 152 are connected to an aggregator/de-aggregator unit 134. Aggregator/de-aggregator unit 134 includes an aggregated signal transmitter 136 and an aggregated signal receiver 135. Aggregated signal transmitter 136 sends an aggregated signal to subsystem 101 via aggregated signal line 137. Aggregated signal receiver 135 receives an aggregated signal from subsystem 101 via aggregated signal line 133.

Examples of high-speed data modules 110, 112, 140, and 142, and low-speed data modules 120 and 150 include a Display Port (DP), an Embedded Display Port (eDP), an embedded display port auxiliary channel, Integrated Interchip Sound (I2S) serial bus, a backlight controller, a Universal Serial Bus (USB) X.0, an Inter-Integrated Circuit (I2C), a digital microphone, a camera, a camera strobe, a video camera, a sensor, a point-of-load power regulator, a power regulator controller, a Mobile Industry Processor Interface (MiPi), and the like. High-speed data modules 110, 112, 140, and 142, and low-speed data modules 120 and 150 represent digital sources, such as data or control sources, quasi-analog sources, such as discrete level Pulse-Width Modulated (PWM) sources, or a combination thereof. As such, high-speed signal lines 111, 113, 114, 141, 143, and 144 and low-speed signal lines 121, 122, 151, and 152 are configured to communicate signals including diverse high-speed signals associated with high-speed data modules 110 and 112, and diverse low-speed signals associated with low-speed data modules 120. Examples of high-speed signals and low-speed signals can include a power management control signal, an asynchronous signal, a sideband signal, a video signal, a camera signal, a digital signal, a digital audio signal, an out of band (OOB) signal, a control strobe, a wireless signal, a camera control power state management signal, a low voltage differential signal, a low voltage Alternating Current (AC) coupled differential signal, a time domain signal, a space domain signal, and the like.

Aggregator/de-aggregator unit 130 operates to: receive high-speed signals from high-speed signal lines 113 and low-speed signals from low-speed signal lines 121, aggregate the high-speed signals and the low-speed signals into an aggregated signal, and transmit, by aggregated signal transmitter 131, the aggregated signal to subsystem 102 via aggregated signal line 133. Each one of the received high-speed signals and low-speed signals are aggregated based on the specific type of each high-speed and low-speed signal by an aggregation algorithm implemented by aggregator/de-aggregator 130. Examples of the different characteristics and types of each diverse signal can include different voltages, different frequencies, different wave forms (pulse wave forms), and different types of signals (analog, digital, quasi-analog, quasi-PWM, quasi-analog time domain signals, and time domain references), different state representations, and the like. Examples of the different characteristics of each diverse signal line can include different wire gages, different coax, different impedances, different structures, and the like. The aggregation algorithm implemented by aggregator/de-aggregator 130 includes an encoding phase that encodes each diverse signal based on these different characteristics and types of each signal and signal line to create an encoded signal with different states on a single wire. The aggregation algorithm further includes a time domain protocol that aggregates the encoded signals into an aggregated signal (a concatenation of the diverse set of encoded signals) that has many different states within a single aggregated signal line 133 or 137 such that at any given time the aggregated signal represents the state condition of each encoded signal. An example of aggregation algorithm includes a signal modulation algorithm, a Digital Signal Processing (DSP) algorithm, an audio/video compression algorithm, an audio/video de-compression algorithm, a digital image processing algorithm, an encryption/de-encryption algorithm, an analog to digital conversion algorithm, a digital to analog conversion algorithm, another aggregation algorithm, or a combination thereof. As such, aggregated signal transmitter 131 can represent one or more high-speed serial links, a multi-level digital transmission link, a high-speed Serializer/Deserializer (SerDes) device, another signal transmitter, or a combination thereof. As such, aggregated signal line 133 can represent one or more twisted pair transmission lines, coaxial cables, optical fiber cables, differential transmission lines (Tx/Rx), wireless short-haul cables, radio-frequency transmission lines, high-speed data busses, parallel lines, ladder lines, strip-lines, stepped transmission lines, microstrip, other transmission lines, or a combination thereof.

Aggregator/de-aggregator unit 134 operates to: receive aggregated signal from subsystem 101 via aggregated signal line 133 at aggregated signal receiver 135, de-aggregate received aggregated signal into each component of high-speed signals and low-speed signals to recover each high-speed signal and each low-speed signal, provide the high-speed signals on high-speed signal lines 143, and provide the low-speed signals on low-speed signal lines 151. As such, aggregator/de-aggregator unit 134 applies the inverse of the aggregation algorithm applied by aggregator/de-aggregator unit 130.

Aggregator/de-aggregator unit 134 also operates similarly to aggregator/de-aggregator unit 130 to: receive one or more high-speed signals from high-speed signal lines 144 and one or more low-speed signals from low-speed signal lines 152 aggregate the high-speed signals and the low-speed signals into an aggregated signal, and transmit, by aggregated signal transmitter 136, the aggregated signal to subsystem 101 via aggregated signal line 137. Each one of the received high-speed signals and low-speed signals are aggregated based on the specific type of each high-speed and low-speed signal by an aggregation algorithm implemented by aggregator/de-aggregator 134.

The aggregation algorithm applied by aggregator/de-aggregator 134 can be the same aggregation algorithm as is applied by aggregator/de-aggregator unit 130, or the aggregation algorithm applied by aggregator/de-aggregator 134 can be different from the aggregation algorithm applied by aggregator/de-aggregator unit 130, as needed or desired. As such, aggregated signal transmitter 136 can be similar to aggregated signal transmitter 131, or aggregated signal transmitter 136 can be different from aggregated signal transmitter 131.

Here, aggregator/de-aggregator unit 130 operates to: receive the aggregated signal from subsystem 102 via aggregated signal line 137 at aggregated signal receiver 132, de-aggregate received aggregated signal into each component of high-speed signals and low-speed signals to recover each high-speed signal and each low-speed signal, provide the high-speed signals on high-speed signal lines 114, and provide the low-speed signals on low-speed signal lines 122. As such, aggregator/de-aggregator unit 130 applies the inverse of aggregation algorithm applied by aggregator/de-aggregator unit 134.

In this manner, aggregator/de-aggregator 130 and 134 allows for the transmission or reception of diverse signals between subsystems 101 and 102, while minimizing the number of signal lines at connector 103. Minimizing the number of signal lines results in the reduction or elimination of issues with cable routing, size, mechanical, device Identification (ID), electrical layout, and Electromagnetic Interference/Electromagnetic Compatibility (EMI/EMC) concerns associated with the number of signal lines. The reduction of signal lines also minimizes the size and cost of the connector 103 between subsystems 101 and 102.

In an embodiment, information handling system 100 utilizes a point of load topology for power distribution (not shown), where the regulated power is generated adjacent to the load. As such, one or more of high-speed data modules 110, 112, 140, and 142, and low-speed data modules 120 and 150 include a power regulator. Subsystem 101 includes a power regulator control unit that controls each power regulator via an associated set of low-speed power regulator control and monitoring signals. Low-speed power regulator control signals associated with each power regulator in subsystem 102 are transmitted to subsystem 102 by subsystem 101 as part of aggregated signal via aggregated signal line 133. Similarly, low-speed power regulator monitoring signals are transmitted to subsystem 101 by subsystem 102 as part of aggregated signal via aggregated signal line 137.

In an embodiment, the signals transmitted between high-speed data modules 110, 112, 140, and 142, and low-speed data modules 120 and 150 are not necessarily mirrored upstream and down. For example, one or more of high-speed data modules 110 and 112 can provide a high-bandwidth video signal to a display element in subsystem 102, and there may be no need for subsystem 101 to receive such a high-bandwidth signal back from subsystem 102. In an embodiment, aggregator/de-aggregator units 130 and 134 have one aggregated signal line per direction, such as a single pair of aggregated signal lines 133 and 137. In another embodiment, aggregator/de-aggregator units 130 and 134 have a more than one aggregated signal lines in a particular direction. For example, an aggregated signal line can represent two or more aggregated signal lines. In yet another embodiment, aggregator/de-aggregator units 130 and 134 have no aggregated signal line in a particular direction. For example, a first aggregator/de-aggregator can include an aggregated signal transmitter and no aggregated signal receiver, and an associated second aggregator/de-aggregator can include an aggregated signal receiver and no aggregated signal transmitter.

Aggregator/de-aggregator units 130 and 134 may be a Field Programmable Gate Array (FPGA), a Complex Programmable Logic Device (CPLD), an Application-Specific Integrated Circuit (ASIC), a High-Performance Reconfigurable Computing (HPRC) device, a hybrid-core computing device, a Reconfigurable Data Path Array (rDPA), a mixed signal integrated circuit, a fixed logic device, another type of logic circuit capable of performing operations, and the like. In an exemplary embodiment, aggregator/de-aggregator units 130 and 134 are FPGAs.

In an embodiment, information handling system 100 pre-configures aggregator/de-aggregator units 130 and 134 during a configuration process of information handling system 100. Alternatively, information handling system 100 configures aggregator/de-aggregator units 130 and 134 during initialization or restart.

FIG. 2 shows an execution flow of a transmission of high-speed and low-speed signals from high-speed data modules 112 and low-speed data modules 120 of subsystem 101 to high-speed data modules 142 and low-speed data modules 150 of subsystem 102 according to an embodiment of the present disclosure. In step 290, high-speed data modules 112 provide high-speed signals on high-speed signal lines 113 and low-speed data modules 120 provide low-speed signals on low-speed signal lines 121 to aggregator/de-aggregator unit 130. Further, high-speed data modules 110 provide high-speed signals on high-speed signal lines 111 to high-speed data modules 140.

In step 291, in response to receiving the high-speed signals associated with high-speed data modules 112 and the low-speed signals associated with low-speed data modules 120, aggregator/de-aggregator unit 130 applies an aggregation algorithm to aggregate the high-speed signals and the low-speed signals to create an aggregated signal. Aggregated signal transmitter 131 transmits the aggregated signal to aggregator/de-aggregator unit 134 via aggregated signal line 133.

In step 292, in response to aggregated signal receiver 135 receiving the aggregated signal via aggregated signal line 133, aggregator/de-aggregator unit 134 applies a de-aggregation algorithm to de-aggregate the received aggregated signal into each component of the high-speed signals and the low-speed signals to recover the high-speed signals associated with high-speed data modules 112, and to recover the low-speed signals associated with low-speed data modules 120. Further, aggregator/de-aggregator 134 provides the high-speed signals on high-speed signal lines 143, and provides the low-speed signals on low-speed signal lines 151.

FIG. 3 shows an execution flow of a transmission of high-speed signals and low-speed signals from high-speed data modules 142 and low-speed data modules 150 of subsystem 102 to high-speed data modules 112 and low-speed data modules 120 of subsystem 101 according to an embodiment of the present disclosure. In step 390, high-speed data modules 142 provide high-speed signals on high-speed signal lines 144 and low-speed data modules 150 provide low-speed signals on low-speed signal lines 152 to aggregator/de-aggregator unit 134. Further, high-speed data modules 140 provide high-speed signals on high-speed signal lines 141 to high-speed data modules 110.

In step 391, in response to receiving the high-speed signals associated with high-speed data modules 142 and low-speed signals associated with low-speed data modules

150, aggregator/de-aggregator unit 134 applies an aggregation algorithm to aggregate the high-speed signals and the low-speed signals to create an aggregated signal. Aggregated signal transmitter 136 transmits the aggregated signal to aggregator/de-aggregator unit 130 via aggregated signal line 137.

In step 392, in response to aggregated signal receiver 132 receiving the aggregated signal via aggregated signal line 137, aggregator/de-aggregator unit 130 applies a de-aggregation algorithm to de-aggregate received aggregated signal into each component of the high-speed signals and the low-speed signals to recover the high-speed signals associated with high-speed data modules 142, and to recover the low-speed signals associated with low-speed data modules 150. Aggregator/de-aggregator 130 provides the high-speed signals on high-speed signal lines 114, and provides the low-speed signals on low-speed signal lines 122.

Figure 4:
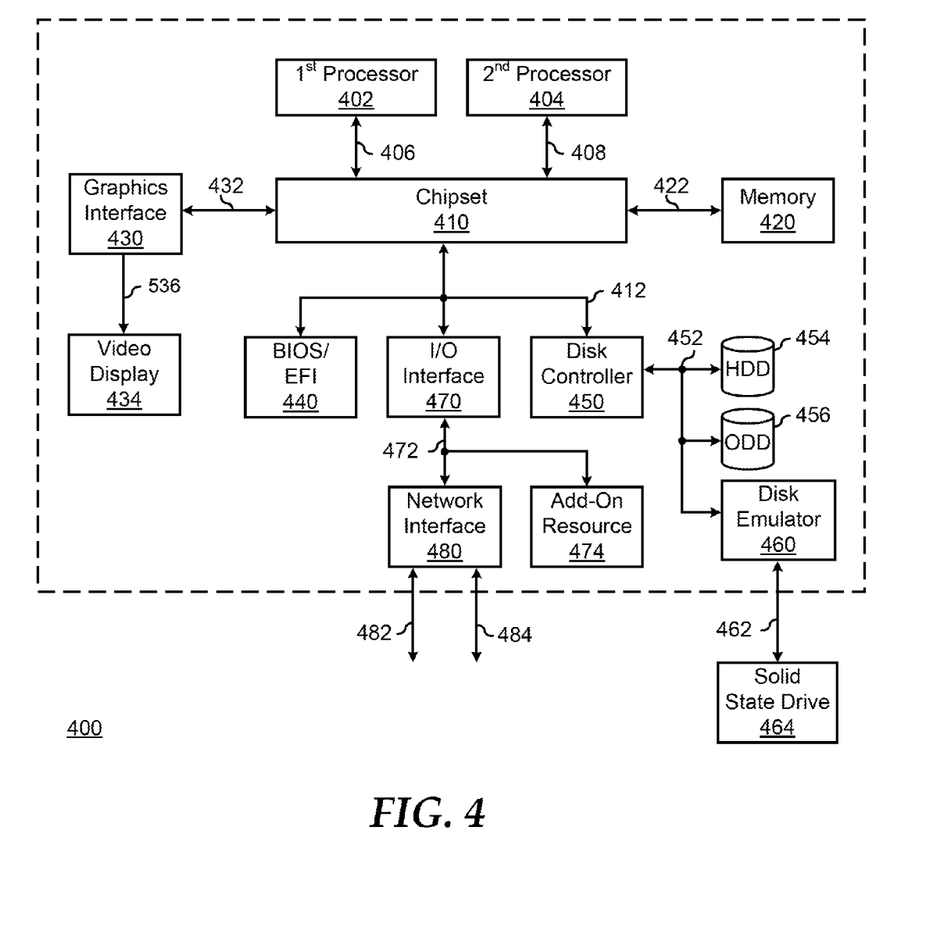
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a Central Processing Unit (CPU), a Programmable Logic Array (PLA), an embedded device such as a System-On-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various Input and Output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a Basic Input Output System/Extensible Firmware Interface (BIOS/EFI) module 440, a disk controller 450, a disk emulator 460, an Input/Output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes Random Access Memory (RAM) such as Static RAM (SRAM), Dynamic RAM (DRAM), Non-Volatile RAM (NV-RAM), or the like, Read Only Memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a Hard Disk Drive (HDD) 454, to an Optical Disk Drive (ODD) 456, and to disk emulator 460. An example of disk interface 452 includes an Integrated Drive Electronics (IDE) interface, an Advanced Technology Attachment (ATA) such as a Parallel ATA (PATA) interface or a Serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474 and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a Network Interface Card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a first hardware subsystem including a first aggregator unit; and
a second hardware subsystem coupled to the first aggregator unit via a first aggregated signal line;
the first aggregator unit configured to:
receive a first signal and a second signal, the first signal and the second signal are different types of signals;
aggregate, based upon a first aggregation algorithm, the first signal and the second signal to create a first aggregated signal, the first aggregation algorithm aggregates the first signal and the second signal based on a specific type of each signal;
provide the first aggregated signal to the second hardware subsystem via the first aggregated signal line;
a second aggregated signal line coupled to the first aggregator unit and a second aggregator unit of the second hardware subsystem;
the second aggregator unit configured to:
receive a third signal and a fourth signal, the third signal and the fourth signal are different types of signals;
aggregate, based upon a second aggregation algorithm, the third signal and the fourth signal to create a second aggregated signal, the second aggregation algorithm aggregates the third signal and the fourth signal based on a specific type of each signal; and
provide the second aggregated signal to the first hardware subsystem via the second aggregated signal line.

2. The information handling system of claim 1, further comprising:
a second aggregated signal line coupled to the first aggregator unit and a second aggregator unit of the second hardware subsystem;
the first aggregator unit further configured to:
receive, via the second aggregated signal line, a second aggregated signal from the second aggregator unit; and
de-aggregate the second aggregated signal to recover a third signal and a fourth signal, the de-aggregation is based on an inverse of a second aggregation algorithm utilized by the second aggregator unit to create the second aggregated signal, and the third signal and the fourth signal are different types of signals.

3. The information handling system of claim 1, further comprising:
a second aggregator unit of the second hardware subsystem configured to:
receive, via the first aggregated signal line, the first aggregated signal from the first aggregator unit; and
de-aggregate the first aggregated signal to recover the first signal and the second signal, the de-aggregation is based on an inverse of the first aggregation algorithm.

4. The information handling system of claim 1, the first aggregator unit further comprises:
an aggregated signal transmitter being configured to provide the first aggregated signal.

5. The information handling system of claim 2, the first aggregator unit further comprises:
an aggregated signal receiver being configured to receive the second aggregated signal.

6. The information handling system of claim 4, wherein the aggregated signal transmitter comprises at least one of a high-speed serial link, a multi-level digital transmission link, and a high-speed serializer/deserializer device.

7. The information handling system of claim 1, wherein the first aggregation algorithm comprises at least one of a signal modulation algorithm, a digital signal processing algorithm, an audio/video compression algorithm, an audio/video de-compression algorithm, a digital image processing algorithm, an encryption/de-encryption algorithm, an analog to digital conversion algorithm, and a digital to analog conversion algorithm.

8. The information handling system of claim 1, wherein the first aggregated signal line comprises at least one of a twisted pair transmission line, a coaxial cable, an optical fiber cable, a differential transmission line, a wireless short-haul cable, a radio-frequency transmission line, a high-speed data bus, a parallel line, a ladder line, a strip-line, a stepped transmission line, and a micro-strip.

9. The information handling system of claim 1, wherein the first signal and the second signal comprise at least one of a power management control signal, a power management monitoring signal, an asynchronous signal, a sideband signal, a video signal, a camera signal, a digital signal, a digital audio signal, an out of band signal, a control strobe, a wireless signal, a camera control power state management signal, a low voltage differential signal, a low voltage alternating current coupled differential signal, a time domain signal, and a space domain signal.

10. The information handling system of claim 1, wherein the first hardware subsystem and the second hardware subsystem comprise at least one of a laptop computer base subsystem and an associated liquid crystal display lid-up structure subsystem, a mobile phone computing device base subsystem and a human interfaces structure subsystem, a tablet computer base subsystem and a display structure subsystem, and a database server subsystem and a web server subsystem.

11. The information handling system of claim 1, wherein the first aggregator unit comprises at least one of a field programmable gate array, a complex programmable logic device, an application-specific integrated circuit, a high-performance reconfigurable computing device, a hybrid-core computing device, a reconfigurable data path array, a mixed signal integrated circuit, and a fixed logic device.

12. A method comprising:
receiving, by a first aggregator unit of a first subsystem of an information handling system, a first signal and a second signal, the first signal and the second signal are different types of signals;
aggregating, by the first aggregator unit, based upon a first aggregation algorithm, the first signal and the second signal to create a first aggregated signal, the first aggregation algorithm aggregates the first signal and the second signal based on a specific type of each signal;
providing, by the first aggregator unit, the first aggregated signal to a second subsystem of the information handling system via the first aggregated signal line;
receiving, by a second aggregator unit of the second subsystem, a third signal and a fourth signal, the third signal and the fourth signal are different types of signals;
aggregating, by the second aggregator unit, based upon a second aggregation algorithm, the third signal and the fourth signal to create a second aggregated signal, the second aggregation algorithm aggregates the third signal and the fourth signal based on a specific type of each signal; and
providing, by the second aggregator unit, the second aggregated signal to the first subsystem via the second aggregated signal line.

13. The method of claim 12, further comprising:
receiving, by the first aggregator unit, via a second aggregated signal line, a second aggregated signal from a second aggregator unit of the second subsystem; and
de-aggregating, by the first aggregator unit, the second aggregated signal to recover a third signal and a fourth signal, the de-aggregation is based on an inverse of a second aggregation algorithm utilized by the second aggregator unit to create the second aggregated signal, and the third signal and the fourth signal are different types of signals.

14. The method of claim 12, further comprising:
receiving, by a second aggregator unit of the second subsystem, via the first aggregated signal line, the first aggregated signal from the first aggregator unit; and
de-aggregating, by the second aggregator unit, the first aggregated signal to recover the first signal and the second signal, the de-aggregation is based on an inverse of the first aggregation algorithm.

15. An information handling system, comprising:
a first aggregator hardware unit coupled to a first aggregated signal line and a second aggregated signal line to:
receive a first signal and a second signal;
aggregate, based upon a first aggregation algorithm, the first signal and the second signal to create a first aggregated signal, the first aggregation algorithm aggregates the first signal and the second signal based on a specific type of each signal;
provide the first aggregated signal over the first aggregated signal line;
receive a second aggregated signal over the second aggregated signal line;
de-aggregate, based upon an inverse of a second aggregation algorithm, the second aggregated signal to recover a third signal, the first signal, the second signal, and the third signal are different types of signals:
a second aggregator hardware unit coupled to the first aggregated signal line and the second aggregated signal line to:
receive the third signal;
aggregate, based upon the second aggregation algorithm, the third signal to create the second aggregated signal, the second aggregation algorithm aggregates the third signal based on the specific type of the signal;
provide the second aggregated signal over the second aggregated signal line;
receive the first aggregated signal over the first aggregated signal line; and
de-aggregate, based upon an inverse of the first aggregation algorithm, the first aggregated signal to recover the first signal and the second signal.

16. The information handling system of claim 15, wherein the first aggregator hardware unit comprises:
an aggregated signal transmitter configured to provide the first aggregated signal; and
an aggregated signal receiver configured to receive the second aggregated signal.

17. The information handling system of claim 15, wherein the first signal, the second signal, and the third signal comprise at least one of a power management control signal, a power management monitoring signal, an asynchronous signal, a sideband signal, a video signal, a camera signal, a digital signal, a digital audio signal, an out of band signal, a control strobe, a wireless signal, a camera control power state management signal, a low voltage differential signal, a low voltage alternating current coupled differential signal, a time domain signal, and a space domain signal.

* * * * *